(12) United States Patent
Hou et al.

(10) Patent No.: US 11,347,247 B1
(45) Date of Patent: May 31, 2022

(54) SYSTEM AND METHOD FOR REGULATING OUTPUT VOLTAGE LEVEL OF A POWER CONDITIONER

(71) Applicant: DELPHI TECHNOLOGIES IP LIMITED, St. Michael (BB)

(72) Inventors: Jingyi Hou, Westfield, IN (US); Mark R. Keyse, Sharpsville, IN (US); Subhashrahul Shekhar, Rochester Hills, MI (US)

(73) Assignee: Delphi Technologies IP Limited, St. Michael (BB)

( * ) Notice: Subject to any disclaimer, the term of this patent is extended or adjusted under 35 U.S.C. 154(b) by 0 days.

(21) Appl. No.: 17/363,812

(22) Filed: Jun. 30, 2021

(51) Int. Cl.
*G05F 1/56* (2006.01)

(52) U.S. Cl.
CPC ...................... *G05F 1/56* (2013.01)

(58) Field of Classification Search
None
See application file for complete search history.

(56) References Cited

U.S. PATENT DOCUMENTS

| | | | | |
|---|---|---|---|---|
| 8,085,024 B2 * | 12/2011 | Prodic | ................... | H02M 3/157 323/283 |
| 8,319,483 B2 * | 11/2012 | Fishelov | ............. | H02M 3/1582 323/225 |
| 8,541,995 B2 | 9/2013 | Tang et al. | | |
| 9,136,733 B2 | 9/2015 | Narwal et al. | | |
| 9,596,110 B2 * | 3/2017 | Jiang | ...................... | H03F 1/0227 |
| 10,340,854 B2 * | 7/2019 | Zhang | ................... | H03F 1/0216 |
| 10,447,164 B2 * | 10/2019 | Ida | ......................... | H02M 3/156 |
| 2013/0038289 A1 * | 2/2013 | Tse | ........................ | H02J 7/0013 320/126 |
| 2020/0028433 A1 | 1/2020 | Low et al. | | |

* cited by examiner

*Primary Examiner* — Thomas J. Hiltunen

(74) *Attorney, Agent, or Firm* — Joshua M. Haines; Bookoff McAndrews, PLLC

(57) ABSTRACT

A method for regulating a power conditioner output voltage level includes monitoring a first voltage level of a first supply source and a second voltage level of a second supply source and, while the power conditioner is being supplied by the first supply source, controlling a duty-cycle of an output switch of the power conditioner with feedback-based control signals generated based on errors between a target voltage level and samples of the output voltage level obtained at an output voltage sampling frequency. The method also includes, controlling, for a period corresponding to the output voltage sampling frequency, the duty-cycle of the output switch with an estimated control signal. The method also includes, while the power conditioner is being supplied by the second supply source, controlling the duty-cycle of the output switch using the feedback-based control signals.

20 Claims, 7 Drawing Sheets

SYSTEM AND METHOD FOR REGULATING OUTPUT VOLTAGE LEVEL OF A POWER CONDITIONER

TECHNICAL FIELD

This disclosure relates generally to power conditioning, and in particular, to systems and methods for regulating an output voltage level of a power conditioner.

BACKGROUND

Electric power from a supply source such as a battery may require power conditioning as it is being supplied to a microelectronic device such as an automotive electronic control unit (ECU). Power conditioning may include receiving electric power from the supply source and delivering the power to the device at a different output voltage and/or current than that supplied by the supply source. For example, a direct current to direct current (DC-DC) converter is a power conditioner having an arrangement of components for receiving power from a supply source at an input voltage level and delivering power to an ECU, or other load, at a different output voltage level. A power conditioner such as a DC-DC converter may include an arrangement of components for regulating its output voltage level so that, during operation, the output voltage level tends to adhere to a target voltage level.

It may be useful to provide one or more backup supply sources, each of which can be swapped automatically into service, for supplying a power conditioner. Providing one or more backup supply sources may ensure that power may be supplied continuously to the power conditioner and, accordingly, to its load. However, rapidly swapping a backup supply into service as a replacement may rapidly introduce a step change in the input voltage level being supplied to the power conditioner. This, in turn, may drive the power conditioner to produce an overshoot or undershoot in its output voltage level. An overshoot or undershoot in output voltage level may interrupt operation of, and/or damage, the load being supplied via the power conditioner.

SUMMARY

This disclosure relates generally to regulating a power conditioner output voltage level.

An aspect of the disclosed embodiments is a method for regulating a power conditioner output voltage level. The method includes monitoring a first voltage level of a first supply source and a second voltage level of a second supply source. The method also includes, while the power conditioner is being supplied by the first supply source, controlling a duty-cycle of an output switch of the power conditioner with feedback-based control signals generated based on errors between a target voltage level and samples of the output voltage level obtained at an output voltage sampling frequency. The method also includes, responsive to receiving a change signal indicating a change from the power conditioner being supplied by the first supply source to the power conditioner being supplied by the second supply source, controlling, for a period corresponding to the output voltage sampling frequency, the duty-cycle of the output switch with an estimated control signal, the estimated control signal generated by multiplying a previously generated feedback-based control signal by a ratio of the first voltage level to the second voltage level. The method also includes, while the power conditioner is being supplied by the second supply source, controlling the duty-cycle of the output switch using the feedback-based control signals.

Another aspect of the disclosed embodiments is a power conditioner output voltage level regulating system. The system includes a processor and a memory including instructions that, when executed by the processor, cause the processor to monitor a first voltage level of a first supply source and a second voltage level of a second supply source. The instructions also cause the processor to, while the power conditioner is being supplied by the first supply source, control a duty-cycle of an output switch of the power conditioner with feedback-based control signals generated based on errors between a target voltage level and samples of the output voltage level obtained at an output voltage sampling frequency. The instructions also cause the processor to, responsive to receiving a change signal indicating a change from the power conditioner being supplied by the first supply source to the power conditioner being supplied by the second supply source, control, for a period corresponding to the output voltage sampling frequency, the duty-cycle of the output switch with an estimated control signal, the estimated control signal generated by multiplying a previously generated feedback-based control signal by a ratio of the first voltage level to the second voltage level. The instructions also cause the processor to, after the period, while the power conditioner is being supplied by the second supply source, control the duty-cycle of the output switch using the feedback-based control signals.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
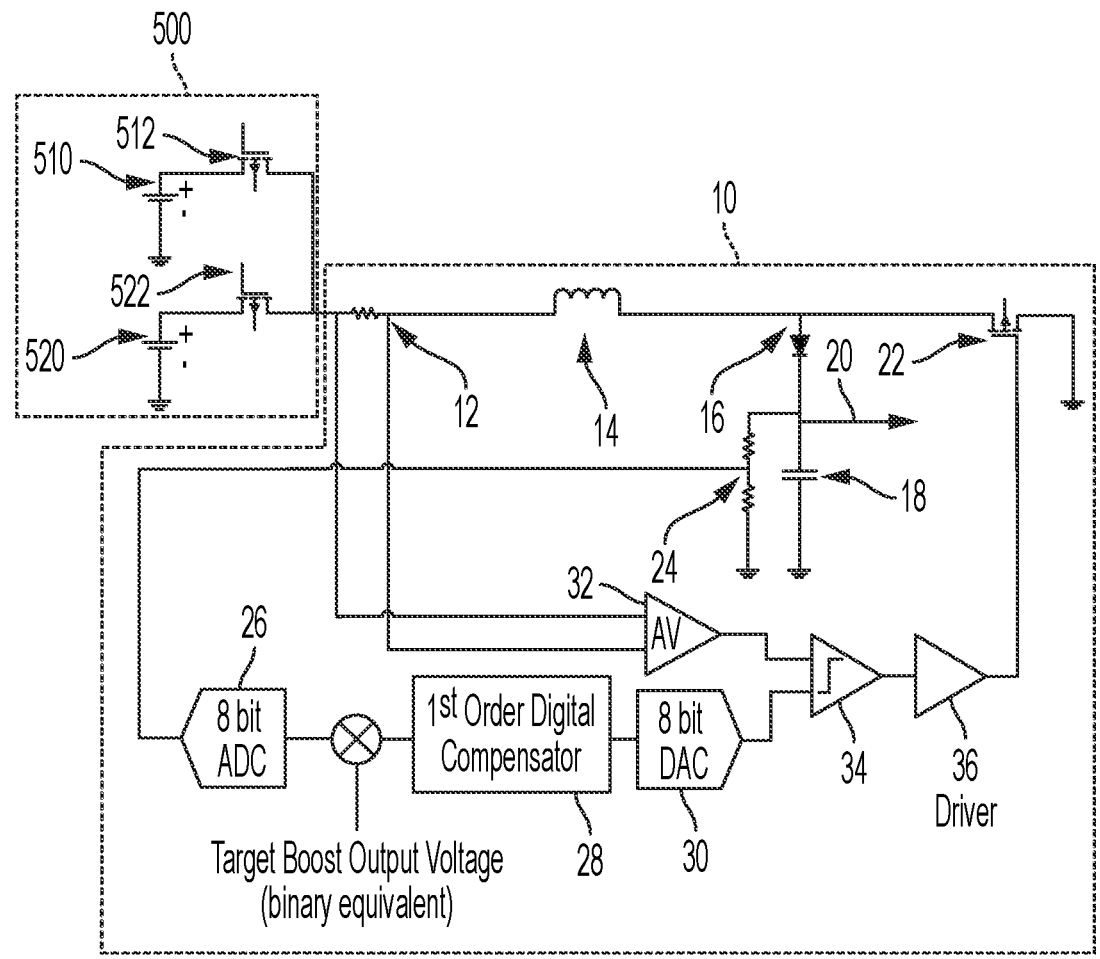
FIG. 1 generally illustrates a power conditioner output voltage level regulating system, where the power conditioner is a DC-DC converter with feedback-based control, according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some embodiments, a power conditioner includes a DC-DC converter configured to regulate its output voltage level. Embodiments of DC-DC converters disclosed herein should not be interpreted, or otherwise used, as limiting the scope of the disclosure, including the claims. For example, the disclosure may be applicable in other kinds of power conditioners.

A DC-DC converter that delivers a higher voltage level to a load than that provided by its input supply source is known as a boost converter, whereas a DC-DC converter that delivers a lower voltage level to a load than that provided by the input supply source is known as a buck converter. A DC-DC converter that combines functions of buck and boost converters is known as a buck-boost converter.

In order to regulate the output voltage level of a DC-DC converter, thereby to keep the output voltage level to within a desired range, it can be useful to integrate feedback-based control. Digital feedback-based control may involve comparing periodic samples of an output voltage level to a target voltage level, and controlling the duty-cycle of an output switch connected between an output terminal of the DC-DC converter and ground. Control over the duty-cycle may be based on differences—or errors—between the output voltage level and the target voltage level calculated using a digital compensator. Digital feedback-based control may include controlling the duty-cycle of the output switch so that a next error, as measured between a subsequent sample of the output voltage level and the target voltage level, may be lower than a present error. Such control may cause the output voltage level to tend towards the target voltage level.

Digital feedback-based control may also involve spreading duty-cycle changes over a number of sample periods in response to calculated errors. A particular large spike in error calculated during a particular sampling period may thereby be inhibited from causing a correspondingly large spike change in duty-cycle during the next sampling period. Spreading duty-cycle changes over a number of sample periods may lend stability to system controlled using feedback.

It can be desirable to make multiple supply sources available to a DC-DC converter, so that in the event of failure or decline of a first supply source, a second supply source—or backup—can be automatically swapped in i.e., can be used to supply the DC-DC converter in lieu of the first supply source. Delivery of conditioned power via the DC-DC converter to a load can continue up to, through, and after the change from the first supply source to the second supply source.

A second supply source may have different ratings than a first supply source or may have the same ratings as the first supply source while, in practice, supplying a different voltage than that of the first supply source. A change from a first supply source to a second supply source can therefore introduce a step change in input voltage to a power conditioner. In the case of a DC-DC converter, a large enough voltage differential between a first supply source and a second supply source can result in a large overshoot or undershoot of the output voltage of the DC-DC converter. This can cause the load for which the DC-DC converter is conditioning power to be receiving the power at a voltage that is outside of its operating region. Receiving power at a voltage that is outside of an operating region of a load can disrupt operation of and/or damage the load.

Despite the operation of digital feedback-based control, a spike in the error between the output voltage level and the target voltage level may be detected only through feedback according to the rate at which the output voltage level is sampled. Furthermore, while a sudden spike in error may inform a change in the duty-cycle of the output switch so that the output voltage level may tend towards the target voltage level, for the sake of stability of steady-state operation the change itself can be spread out over multiple sampling periods. The speed at which an overshoot/undershoot is clamped down through feedback-based control is therefore contingent on the speed of the sampling for providing a high enough open loop gain-bandwidth product (GBW), how duty-cycle control is affected over multiple samples in response to errors, and the speed at which the output switch itself can be switched. Higher-speed sampling, faster processing, and faster output switching may require higher-cost components, a higher power budget, and/or entire changes in architecture.

The values of other circuit components of a power conditioner, such as its inductors and capacitors, may be selected to provide a line-to-output transfer function that reduces the magnitude and settling time of such an overshoot/undershoot. However, this may require increases in the sizes of such components, which may increase costs. Furthermore, modifying such circuit components to dampen such overshoot/undershoot may unduly degrade the feedback response under low load conditions.

FIG. 1 generally illustrates a power conditioner output voltage level regulating system. In this embodiment, the power conditioner is a DC-DC converter 10 with feedback-based control for conditioning power from first and second supply sources 510 and 520. The conditioned power may, in turn, be supplied to a load such as an automotive engine control unit (ECU), according to the principles of the present disclosure. In this embodiment, each of first supply source 510 and second supply source 520 is a battery. In this embodiment, DC-DC converter 10 is a boost converter. Each of first supply source 510 and second supply source 520 is arranged to supply power to DC-DC converter 10 via a respective switch 512 and 522. In this embodiment, each of switch 512 and switch 522 is a MOSFET (Metal Oxide Semiconductor Field Effect Transformer) with respective gate control provided by an external system, such as a master control unit (MCU) of an automobile (not shown). The external system ensures, through control over gates of switches 512 and 522, that only one of switches 512 and 522 is closed at any given time, thereby to ensure that only one of first supply source 510 and second supply source 520 is providing power to DC-DC converter 10 at any given time. The external system may swap first supply source 510 with second supply source 520 by switching switch 512 from ON to OFF at the same time as switching switch 522 from OFF to ON. It will be appreciated that additional supply sources and/or different forms of supply sources may be incorporated as part of power supply system 500.

DC-DC converter 10 receives input power from power supply system 500, and conveys electrical current via a sense resistor 12 through a series inductor 14 to a first terminal of a diode 16. A second terminal of diode 16 is connected to a first terminal of a capacitor 18. An output terminal 20 also extends from the first terminal of capacitor 18 as a connection point for supplying output voltage of the DC-DC converter 10 to a load, such as an automotive engine control unit (not shown). The second terminal of capacitor 18 is connected to ground. The first terminal of diode 16 is also connected to the source terminal of an output switch 22. The drain terminal of output switch 22 is connected to ground. In this embodiment, output switch 22 is a MOSFET with gate control provided using a pulse-width-modulation (PWM) signal thereby to control the duty-cycle of output switch 22, as will be described.

A resistor-divider network 24 is connected at output terminal 20 to measure the output voltage level for feedback control. The output of resistor-divider network 24 serves as input to an analog-to-digital converter (ADC). In this embodiment the ADC is an 8-bit ADC 26. ADC 26 samples its input periodically according to a sample rate, thereby to sample the output voltage level, and outputs a digital value representative of the sampled output voltage level. The digital value representative of the sampled output voltage level is subtracted from a digital value of a target voltage level. The target voltage level serves as a reference voltage level. The result of the subtraction—the error between the digital values—is provided as input to a digital compensator 28. In this embodiment, digital compensator 28 is a first-order digital compensator.

Digital compensator 28 receive a present error (i.e., the difference between the present sample of the output voltage level and the target voltage level) and uses the present error and the previous error (i.e., the difference between the previous sample of the output voltage level and the target voltage level), along with its own previous output, to calculate a present output. In particular, digital compensator 28 carries out a discrete mathematical calculation as in Equation 1 below:

$$Y[n]=Y[n-1]+A*X[n]-B*X[n-1] \quad (1)$$

where: Y[n] is the present output; Y[n−1] is the previous output; X[n] is the present error; X[n] is the previous error; and A, B are constants.

The respective values of A and B are selected for a particular implementation and are related to the open loop unity gain frequency of digital compensator 28.

The present output Y[n] of digital compensator 28 is provided as input to a digital-to-analog converter (DAC) 30, which itself outputs an analog signal representative of Y[n].

Current through inductor 14 is obtained by obtaining current through a sense resistor 12 connected in series with inductor 14, and this current is provided as a signal input to an amplifier 32. Amplified output of amplifier 32 is, along with the output of DAC 30, provided as input to a comparator 34. Comparator 34 outputs a binary ON or OFF signal based on a comparison between the output of amplifier 32 and the output of DAC 30. This binary ON or OFF signal serves as a pulse-width-modulation (PWM) signal for controlling the duty-cycle of output switch 22 via a driver 36 connected to the gate of output switch 22. By controlling the duty-cycle of output switch 22 in this manner, the output voltage level available at output terminal 20 can be regulated so that it generally tends towards equaling the target voltage level through the operation of DC-DC converter 10.

As described herein, an external system such as an MCU may swap first and second supply sources 510 and 520 by switching switch 512 from ON to OFF at the same time as switching switch 522 from OFF to ON. If this happens, the output of digital compensator 28 Y[n] is not updated immediately. In particular, Y[n] is updated only once error data X[n] is updated, which depends on the sampling rate of ADC 26. Further, subsequent adjustment to Y[n] responsive to what might be a significant step change in input voltage level is limited by the gain of the compensation loop. For example, if the loop gain is small, no significant adjustment in the value of Y[n] as compared with Y[n−1] will be made, despite a spike in error, unless the difference between the output voltage level and the target voltage level is very large. In addition, if the loop gain is small, then the spike in error will be integrated over the course of many sampling periods causing the output voltage level itself to be adjusted for the overshoot/undershoot over the course of many sampling periods. In the meantime, the output voltage level may have already gone out of a desirable operating range for the load being supplied, and may have accordingly caused disruptions in the operation of the load and/or damage to the load. It will be appreciated that, because the loop gain is related to the loop stability, increases in the loop gain to more rapidly clamp down on undershoot or overshoot, may unduly affect loop stability.

It may be useful to mitigate output voltage overshoot or undershoot caused by an input voltage level change in another manner.

Long after an input voltage level change, the inductor current may settle into a new steady state value. Furthermore, during steady state operation, the comparator 34 is constantly comparing inductor current signals against output of digital compensator 28 in order to determine the feedback-based control signals for controlling the duty-cycle of output switch 22. Because of this, a ratio between pre-change and post-change output signals of the digital compensator 28 can be approximated by a ratio between the pre-change and post-change inductor currents. Accordingly, the post-change output of digital compensator 28 can be estimated based on the post-change inductor current once this inductor current ratio is known.

Furthermore, where input power of the DC-DC converter is to generally stay the same before and after a supply voltage switch, the ratio between the pre-change and post-change inductor currents as in Equation 2, below, can be estimated as a ratio between the pre-change and post-change outputs of the digital compensator 28, as in Equations 3 and 4, below:

$$V_{firstsupply}*I_{inductorprechange}=V_{secondsupply}*I_{inductorpostchange} \quad (2)$$

$$V_{firstsupply}*V_{compensatorprechange}=V_{secondsupply}*V_{compensatorpostchange} \quad (3)$$

$$V_{compensatorpostchange}=V_{firstsupply}*V_{compensatorprechange}/V_{secondsupply} \quad (4)$$

where: $V_{firstsupply}$ is the voltage level of the first supply source; $V_{secondsupply}$ is voltage level of the second supply source; $I_{inductorprechange}$ is present current through the inductor; $I_{inductorpostchange}$ is current through the inductor after changing to the second supply source; $V_{compensatorprechange}$ is the present output of the digital compensator; and $V_{compensatorpostchange}$ is an estimated post-change output of the digital compensator.

It may be useful to intervene in the feedback loop at the time of a supply source change by causing digital compensator 28 to output the estimated $V_{compensatorpostchange}$ as the control signal at the time of the change, in lieu of the regular feedback-based control signal. Such an intervention at the time of the supply source change may reduce the overshoot/undershoot in the output voltage level that may arise from a step change in input voltage level. After outputting the estimated $V_{compensatorpostchange}$ at the time of the change, digital compensator 28 may be caused to resume outputting the regular feedback-based control signals.

Figure 2:
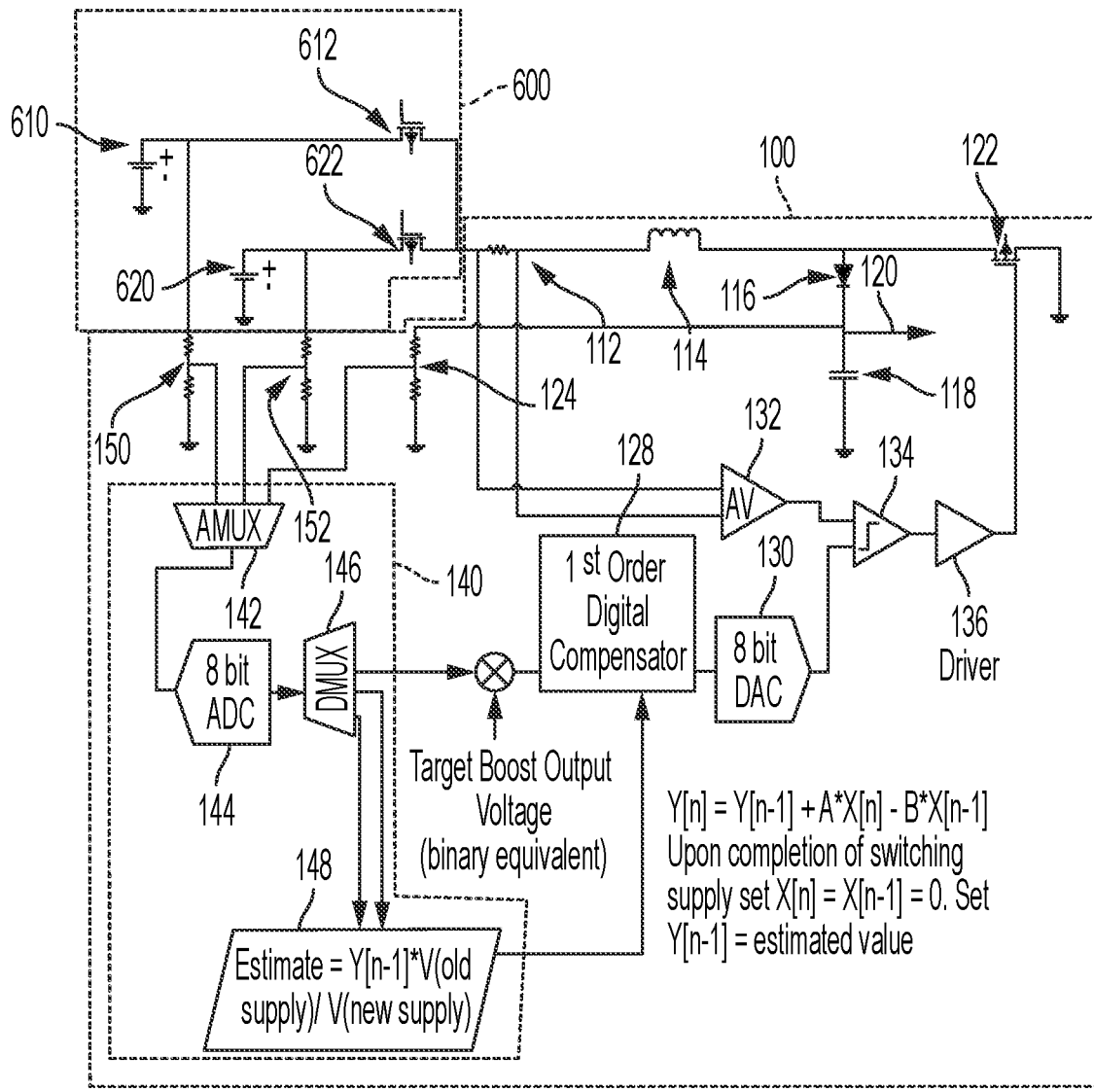
FIG. 2 generally illustrates a power conditioner output voltage level regulating system, wherein the power conditioner is a DC-DC converter with feedback-based control, according to the principles of the present disclosure.

FIG. 2 generally illustrates a power conditioner output voltage level regulating system. In this embodiment, the power conditioner is a DC-DC converter 100 with feedback-based control for conditioning power from first and second supply sources 610 and 620. The conditioned power may, in turn, be supplied to a load such as an automotive engine control unit (ECU), according to the principles of the present disclosure. In this embodiment, each of first supply source 610 and second supply source 620 is a battery. In this embodiment, DC-DC converter 100 is a boost converter. Each of first supply source 610 and second supply source 620 is arranged to supply power to DC-DC converter 100 via a respective switch 612 and 622. In this embodiment, each of switch 612 and switch 622 is a MOSFET with respective gate control provided by an external system, such as an MCU of an automobile (not shown). The external system ensures, through control over gates of switches 612 and 622, that only one of switches 612 and 622 is closed at any given time, thereby to ensure that only one of first supply source 610 and second supply source 620 is providing power to DC-DC converter 100 at any given time. The external system may swap first supply source 610 with second supply source 620 by switching switch 612 from ON to OFF at the same time as switching switch 622 from OFF to ON. It will be appreciated that additional power supply sources and/or different forms of supply sources may be incorporated as part of power supply system 600.

DC-DC converter 100 receives input power from power supply system 600, and conveys current via a sense resistor 112 through a series inductor 114 to a first terminal of a diode 116. A second terminal of diode 116 is connected to a first terminal of a capacitor 118. An output terminal 120 also extends from the first terminal of capacitor 118 as a connection point for supplying output voltage of the DC-DC converter 100 to a load, such as an automotive engine control unit (not shown). The second terminal of capacitor 118 is connected to ground. The first terminal of diode 116 is also connected to the source terminal of an output switch 122. The drain terminal of output switch 122 is connected to ground. In this embodiment, output switch 122 is a MOSFET with gate control provided using a pulse-width-modulation (PWM) signal thereby to control the duty-cycle of output switch 122, as will be described.

A resistor-divider network 124 is connected at the output terminal 120 to measure the output voltage level for feedback control. The output of resistor-divider network 124 serves as one of three inputs to an analog multiplexer AMUX 142 of a controller 140. In this embodiment, controller 140 includes AMUX 142 and other components generally integrated with the DC-DC converter 100 and in communication with a digital compensator 128 as part of the same assembly, for example as part of the same application specific integrated circuit (ASIC). AMUX 142 also receives the output of a resistor-divider network 150 connected to the positive terminal of first supply source 610 thereby to receive as input the voltage of first supply source 610. AMUX 142 also receives the output of a resistor-divider network 152 connected to the positive terminal of second supply source 620 thereby to receive as input the voltage level of second supply source 620. AMUX 142 time-multiplexes the output voltage level, the voltage level of first supply source 610 and the voltage level of second supply source 620, and each of these is provided in respective time slots as input to an analog to digital converted (ADC). In this embodiment, the ADC is an 8-bit ADC 144. ADC 144 samples its three inputs periodically in round-robin fashion according to a sample rate, thereby to periodically sample each of the output voltage level, the voltage level of first supply source 610 and the voltage level of second supply source 620 and to output digital values representative of each of these sampled voltage levels.

Under steady-state operation of DC-DC converter 100, the digital value representative of the sampled output voltage level is subtracted from a digital value of a target voltage level. The target voltage level serves as a reference voltage level. The result of the subtraction—the error between the digital values—is provided as input to a digital compensator 128. In this embodiment, digital compensator 128 is a first-order digital compensator.

Digital compensator 128 receives a present error (i.e., the error between the present sample of the output voltage level and the target voltage level) and uses the present error and the previous error (i.e., the error between the previous sample of the output voltage level and the target voltage level), along with its own previous output, to calculate a present output. In particular, digital compensator carries out a discrete mathematical calculation as in Equation 1 above, and the present output Y[n] of digital compensator 128 is provided as input to a digital-to-analog converter (DAC) 130, which itself outputs an analog signal representative of Y[n].

Current through inductor 114 is obtained by obtaining current through a sense resistor 112 connected in series with inductor 114, and this current is provided as signal input to an amplifier 132. Amplified output of amplifier 132 is, along with the output of DAC 130, provided as input to a comparator 134. Comparator 134 outputs a binary ON or OFF signal based on a comparison between the output of amplifier 132 and the output of DAC 130. This binary ON or OFF signal serves as a pulse-width-modulation (PWM) signal for controlling the duty-cycle of output switch 122 via a driver 136 connected to the gate of output switch 122. By controlling the duty-cycle of output switch 122 in this manner, the output voltage level available at output terminal 120 can be regulated so that it generally tends towards equaling the target voltage level through the operation of DC-DC converter 110.

While DC-DC converter 100 is operating under feedback-based control, the digital values representative of the voltage level of first supply source 610 and the voltage level of second supply source 620 output by ADC 144 are provided to an estimation module 148. Estimation module 148 uses these digital values, along with a value of the previous output of digital compensator 128, to calculate an estimated control signal ($V_{compensatorpostchange}$ as referred to in Equation 4). This estimated control signal is available to be used as the output of digital compensator 128 in lieu of the feedback-based control signal, in the event that there is a change in input voltage level due to a change in input supply from first supply source 610 to second supply source 620. In particular, estimation module 148 carries out a discrete mathematical calculation as in Equation 5, below:

$$Y[n]^{EST} Y[n-1] * V_{first}/V_{second} \quad (5)$$

where: $Y[n]^{EST}$ is an estimated present output; $Y[n-1]$ is the previous output; $V_{first}$ is the voltage level of the first supply source; and $V_{second}$ is the voltage level of the second supply source.

This discrete mathematical calculation may be carried out by estimation module 148 each time new sets of digital values representative of the output voltage level, the voltage level of power supply source 610 and the voltage level of power supply source 620 are output by ADC 144, are provided to estimation module 148. In some embodiments, the discrete mathematical calculation may be carried out less often. In some embodiments, individual calculations of $Y[n]^{EST}$ may be conducted and then combined thereby to generate a rolling average of values of $Y[n]^{EST}$. In some embodiments, the discrete mathematical calculation may be carried out only just before a change from the present supply source to the alternative supply source. Alternatives are possible.

In some embodiments, the estimated present output $Y[n]^{EST}$ of digital compensator 128 is calculated before a supply source change, in order to be available for use in the event that a supply source change is triggered by an external system such as an MCU. A switching event may be triggered in the event that such an external system determines that the first supply source 610 should be swapped with second supply source 620. During a switching event from first supply source 610 to second supply source 620, the external system causes switch 612 to open, and switch 622 to close. The external system also intervenes in the feedback loop operation by providing a change signal to trigger controller 140 to output $Y[n]^{EST}$ to digital compensator 128 and digital compensator 128 to, in turn, output $Y[n]^{EST}$ to DAC 130 in lieu of the feedback-based control signal Y[n] calculated by digital compensator 128. This intervention serves as a predict-and-force mechanism enabling digital compensator 128 to more quickly adapt to the supply source change. This may mitigate the undershoot/overshoot by more quickly adapting Y[n] to the changed input source conditions using the estimation than would allowing Y[n] to be adapted using the feedback loop alone.

In this embodiment, at the time of the change signal, the previous error X[n−1] and the present error X[n], each stored as stored values within respective registers in digital compensator 128, are also reset to zero. Furthermore, the current Y[n] stored within a respective register in digital compensator 128 is reset to $Y[n]^{EST}$. In this way, future feedback-based control signals may be calculated according to Equation 1 using $Y[n]^{EST}$ as the previous output of digital compensator 128 and with the previous error being set to zero. This may enable the go-forward operation of the feedback loop to not be influenced by conditions of DC-DC converter 100 as they were prior to the change signal.

In this embodiment, the output of digital compensator 128 is set to $Y[n]^{EST}$ for just one sampling cycle, thereby interrupting feedback-based control for just the one sampling cycle. After this one cycle, controller 140 then causes digital compensator 128 to resume feedback-based control. In this embodiment, this is done by resuming calculating Y[n] as described herein in connection with Equation 1.

Figure 3:
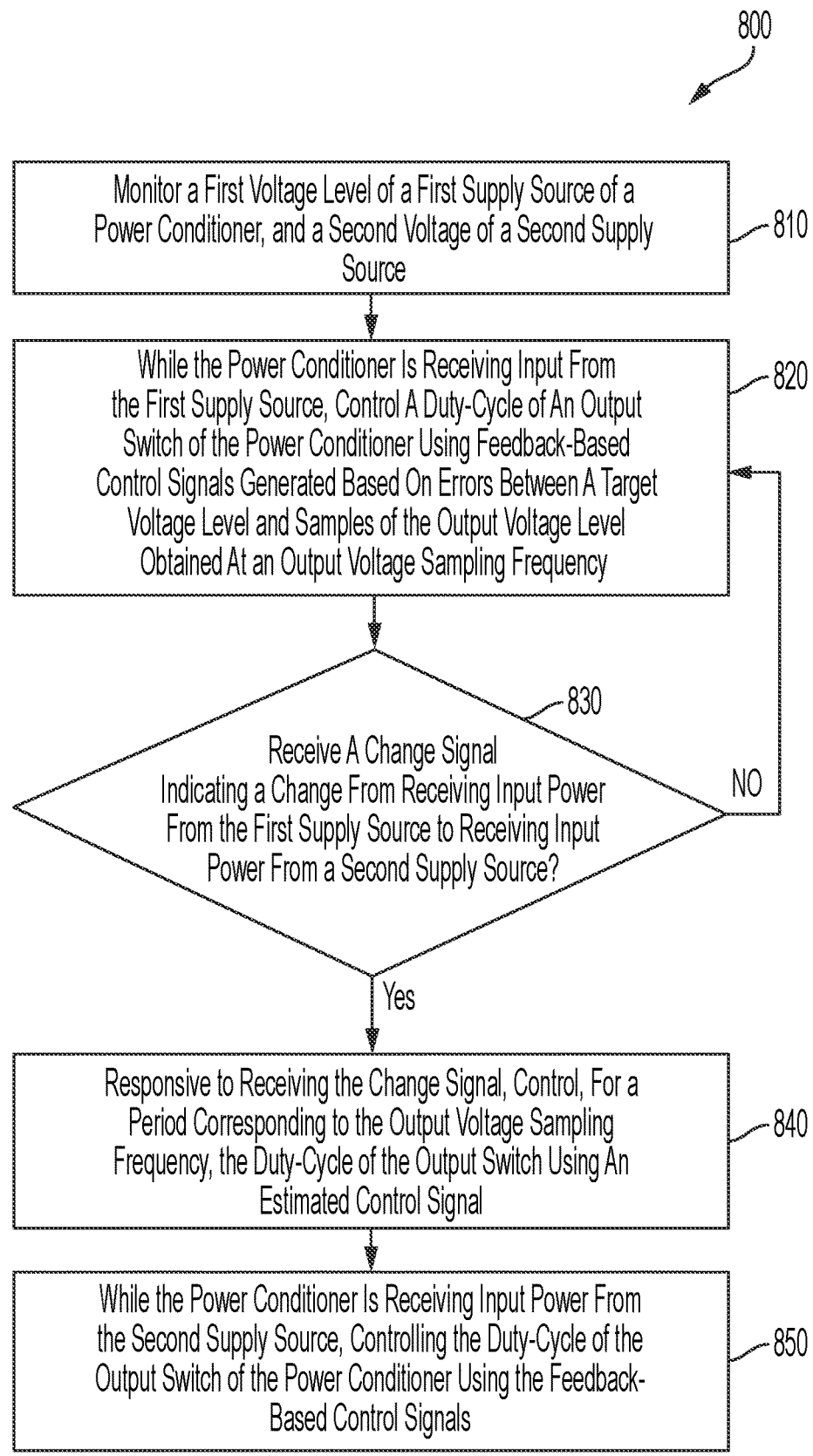
FIG. 3 is a flow diagram generally illustrating a method for regulating a power conditioner output voltage level, according to the principles of the present disclosure.

FIG. 3 is a flow diagram generally illustrating a method 800 for regulating a power conditioner output voltage level, according to the principles of the present disclosure. At 810, the method 800 monitors a first voltage level of a first supply source and a second voltage level of a second supply source. For example, while monitoring, the power conditioner may receive the first and second voltage levels via resistor-divider networks each associated with a respective one of the first and second supply sources. The received first and second voltage levels may be analog time-multiplexed, digitally sampled using an analog-to-digital (ADC) converter at a sampling rate, and the digital samples stored in respective registers by the power conditioner as representative of the received first and second voltage levels. In some embodiments, output voltage levels may also be analog time-multiplexed with the first and second voltage levels, sampled using the same ADC converter as that used for sampling the first and second voltage levels, and stored in a respective register. In some embodiments, output voltage levels may be digitized using a different ADC converter at the same or a different sampling rate as the sampling rate at which the first and second voltage levels are sampled, and stored in a respective register. Storing may include storing in respective registers multiple received voltage levels for each of the received first and second supply sources over time, to thereby maintain a set of the most recent voltage levels for each of the supply sources. A set of, for example, the ten (10) most recent voltage levels continually updated at a sampling rate of the ADC as voltage levels are received may be used to calculate a running average voltage level for each of the first and second supply sources.

At 820, while the power controller is receiving input power from the first supply source, and not receiving input power from the second supply source, the method 800 controls a duty-cycle of an output switch of the power conditioner using feedback-based control signals. In some embodiments, the output switch is a MOSFET associated with an output terminal of the power conditioner, from which the output voltage of the power conditioner can be obtained for use in a load. In some embodiments, the feedback-based control signals are generated based on errors between a target voltage level and samples of the output voltage level obtained at a respective sampling frequency for the output voltage level. For example, each feedback-based control signal may be generated as a sum of a previous feedback-based control signal and a weighted combination of a present error and a previous error. The present error may be calculated as the difference between a present sample of the output voltage level and the target voltage level, and the previous error may be calculated as the difference between a previous sample of the output voltage level and the target voltage level.

In some embodiments, the method 800 controlling the duty-cycle of the output switch using the feedback-based control signals at step 820 may include obtaining current signals indicative of electrical current through an inductor of the power conditioner, providing the feedback-based control signals and the current signals as inputs to a comparator, and driving a gate of the output switch based on an output of the comparator. For example, the output of the comparator may be provided as input to a driver, and the gate of the output switch driven with the output of the driver.

At 830, the method 800 determines whether a change signal indicating a change from the power conditioner receiving input power from the first supply source to the power conditioner receiving input power from the second supply source. If no change signal is received, the method 800 continues from 820.

At 840, responsive to receiving a change signal indicating the change from the power conditioner receiving input power from the first supply source to the power conditioner receiving input power from the second supply source, the method 800 controls, during a period corresponding to the sampling frequency, the duty-cycle of the output switch using an estimated control signal. In some embodiments, the change signal may be received from a master control unit (MCU) or some other system external to the power conditioner. In some embodiments, the estimated control signal is generated by multiplying a previously generated feedback-based control signal by a ratio of the first voltage level to the second voltage level. For example, values of the first and second voltage levels stored during monitoring may be retrieved from respective registers of the power conditioner, used to calculate the ratio, and the ratio multiplied with the previously-generated feedback-based control signal.

In some embodiments, responsive to the change signal, the present error and the previous error are set to zero. For example, the method 800 may set each of the values in registers of the power controller 100 (not shown) for storing the present error and the previous error, to zero.

In some embodiments, at 810, the method 800 has periodically calculated and stored an estimated value of the estimated control signal during monitoring. Then, at 840, the method 800 generates the estimated control signal responsive to the change signal based on the stored estimated value. In some embodiments, responsive to the change signal, at 840, the method 800 calculates an estimated value of the estimated control signal and generates the estimated control signal based on the estimated value.

At 850, after the period, the method 800 resumes, while receiving input power from the second supply source, controlling the duty-cycle of the output switch using the feedback-based control signals. In some embodiments, the period corresponding to the output voltage sampling frequency may be exactly a single sampling period corresponding to the output voltage sampling frequency, such that the duty-cycle of the output switch is controlled using the estimated control signal responsive to the change signal for exactly one single sampling period, after which feedback-based control is resumed.

Figure 4A:
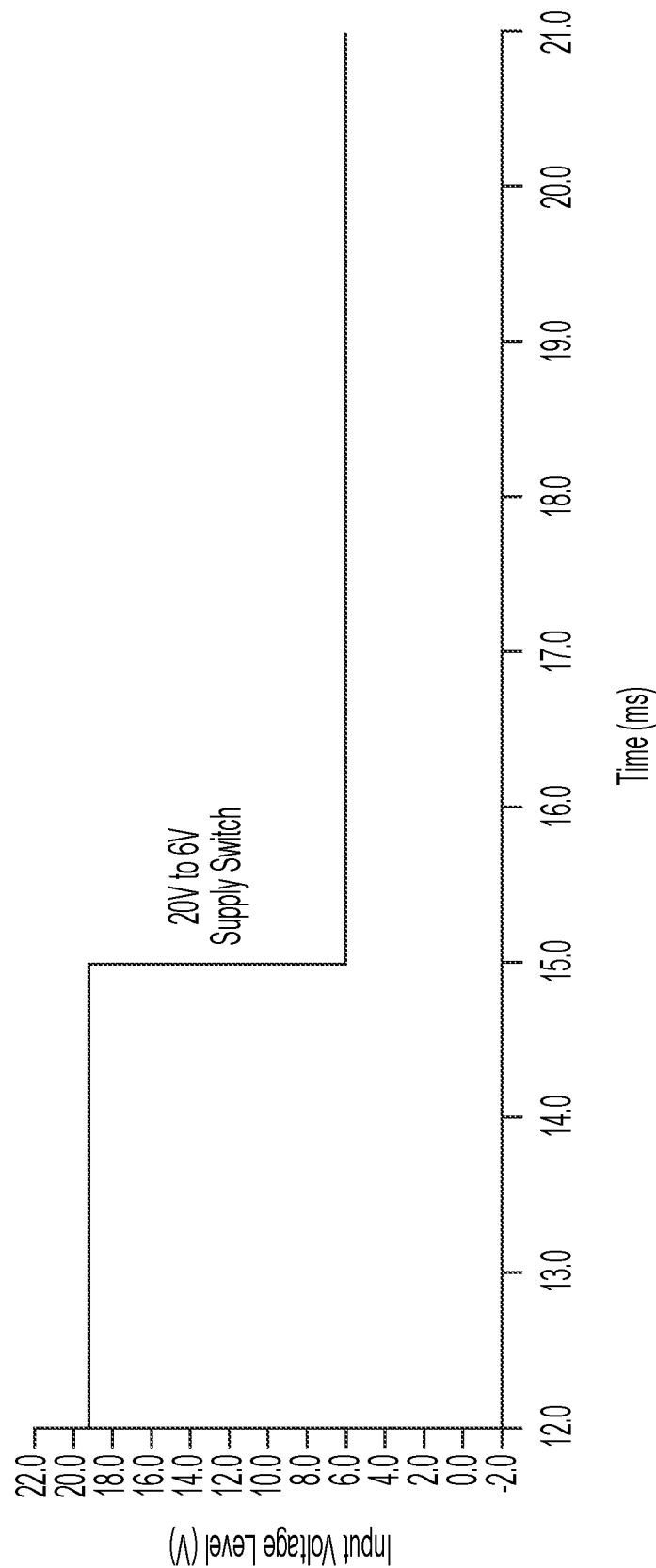
FIGS. 4A and 4B are plots generally illustrating undershoots in output voltage levels responsive to a step change down in input voltage level, modeled based on the power conditioners of FIGS. 1 and 2, respectively, according to the principles of the present disclosure.
Figure 4B:
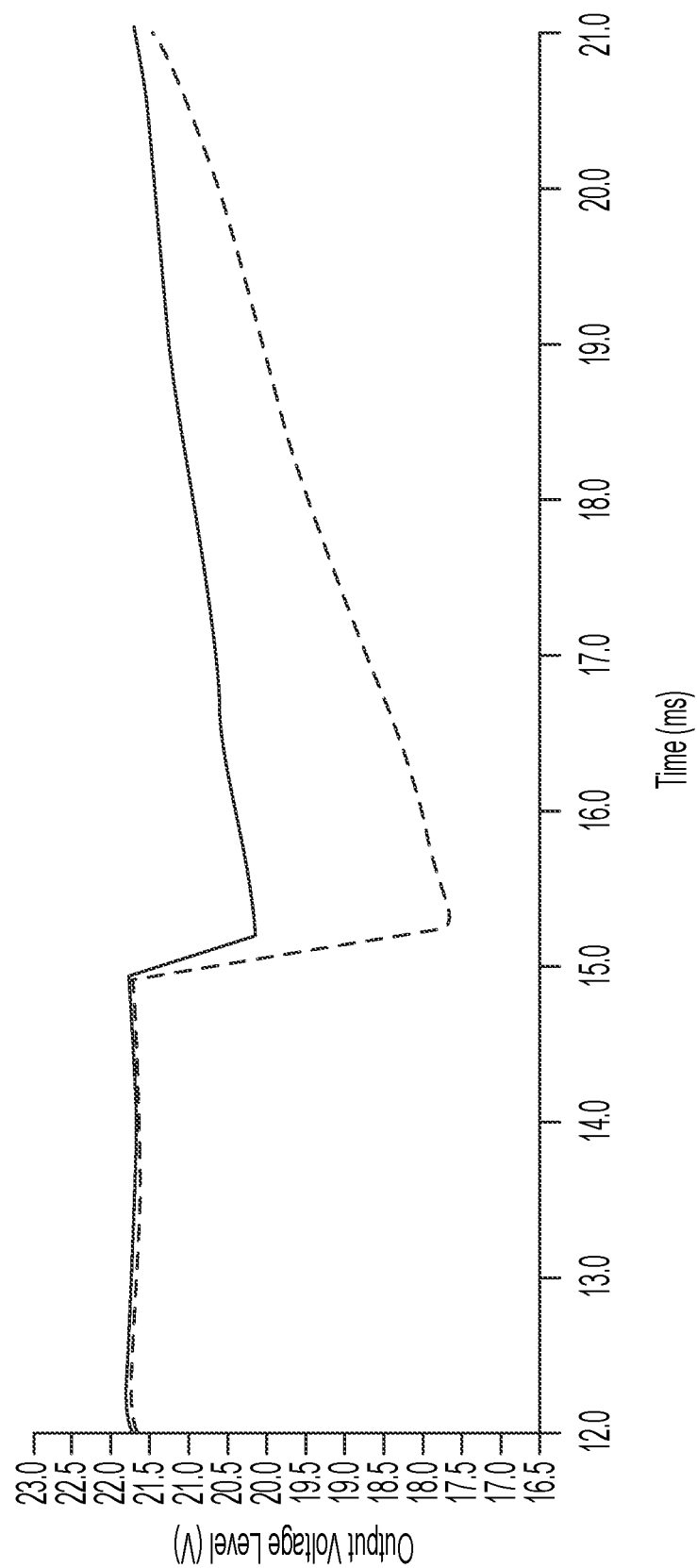

FIGS. 4A and 4B are plots generally illustrating undershoots in output voltage responsive to a step change down in input voltage level, modeled based on DC-DC converters 10 and 100 (each being boost converters), according to the principles of the present disclosure. FIG. 4A shows a step switch in input voltage level to each of DC-DC converter 10 and DC-DC converter 100, from about 20V down to about 6V. This step change in input voltage level is shown as occurring at time 15.0 milliseconds (ms).

The dashed plotline in FIG. 4B represents the output voltage level of DC-DC converter 10, which solely employs feedback-based voltage control, as described herein. At the time of the step change in input voltage level, the output voltage of DC-DC converter 10 drops from just below 22.0V to just above 17.5V over about a quarter of a millisecond and slowly recovers due to the feedback-based control over a period of about 5.5 milliseconds to about the target voltage level of just below 22.0V.

The solid plotline in FIG. 4B represents the output voltage level of DC-DC converter 100, which employs both feedback-based voltage control and the intervention/predict-and-force mechanism, as described herein. At the time of the step change in input voltage level, signaled to DC-DC converter 100 by a change signal from an external system such as an MCU, the output voltage level of DC-DC converter 100 drops from just below 22.0V to just above 20.0V over about a quarter of a millisecond and slowly recovers due to the feedback-based control over a period of about 5.5 milliseconds to about the target voltage level of just below 22.0V. It will be appreciated that the undershoot in output voltage level is significantly mitigated by the configuration of DC-DC converter 100, as compared with the configuration of DC-DC converter 10.

Figure 5A:
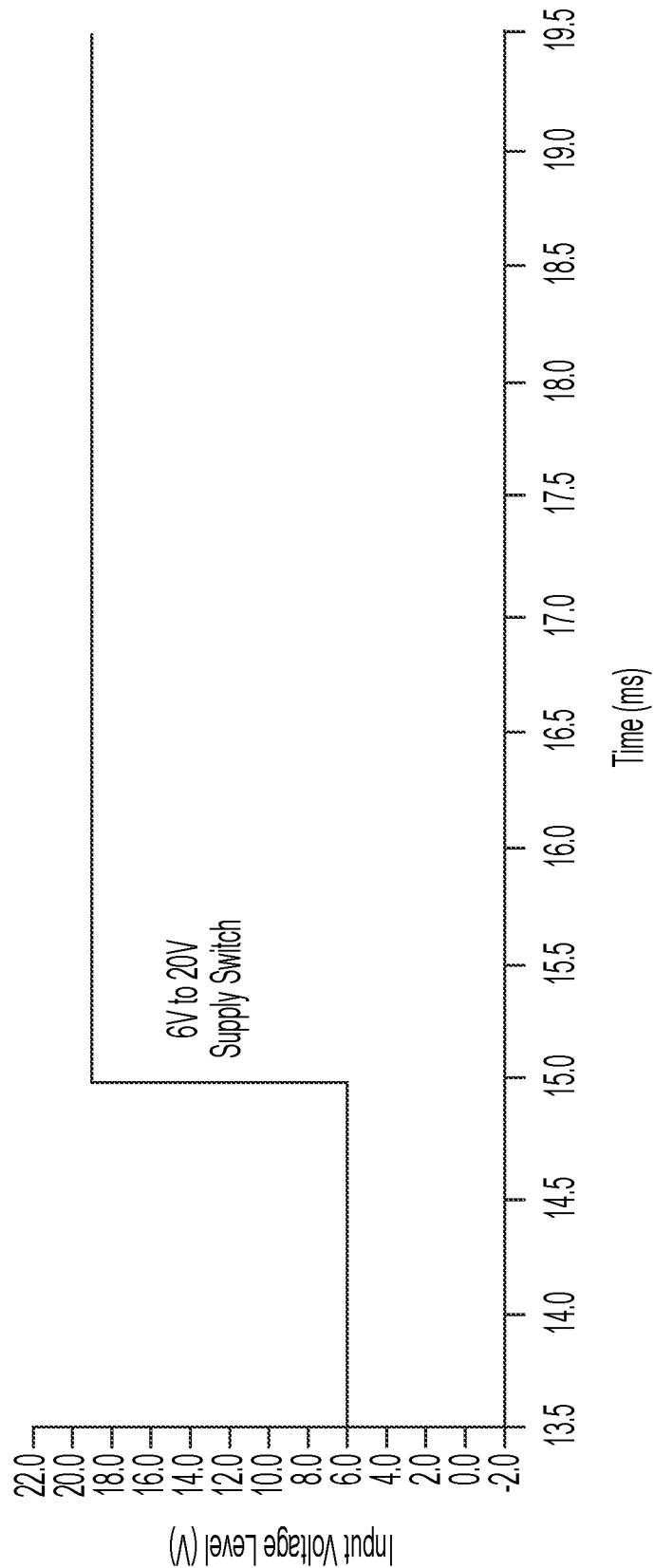
FIGS. 5A and 5B are plots generally illustrating overshoots in output voltage levels responsive to a step change up in input voltage, modeled based on the power conditioners of FIGS. 1 and 2, respectively, according to the principles of the present disclosure.
Figure 5B:
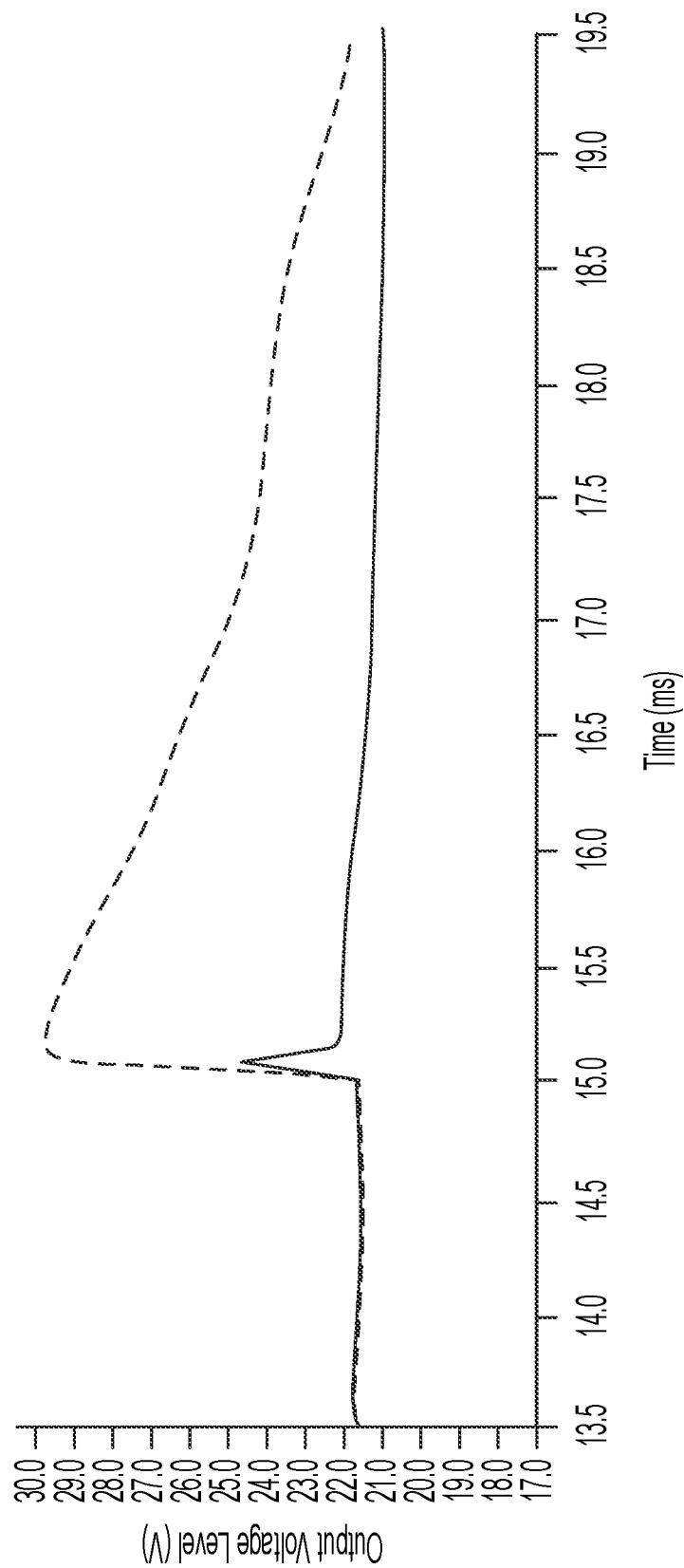

FIGS. 5A and 5B are plots generally illustrating overshoots in output voltage levels responsive to a step change up in input voltage level, modeled based on DC-DC converters 10 and 100, according to the principles of the present disclosure. FIG. 5A shows a step switch in input voltage level to each of DC-DC converter 10 and DC-DC converter 100, from about 6V up to about 20V. This step change in input voltage is shown as occurring at time 15.0 milliseconds (ms).

The dashed plotline in FIG. 5B represents the output voltage level of DC-DC converter 10, which solely employs feedback-based voltage control, as described herein. At the time of the step change in input voltage level, the output voltage of DC-DC converter 10 spikes from just below 22.0V to just below 30.0V over about an eighth of a millisecond and slowly recovers due to the feedback-based control over a period of about 4.5 milliseconds to about the target voltage level of just below 22.0V.

The solid plotline in FIG. 5B represents the output voltage level of DC-DC converter 100, which employs both feedback-based voltage control and the intervention/predict-and-force mechanism as described herein. At the time of the step change in input voltage, the output voltage level of DC-DC converter 100 spikes from just below 22.0V to about 24.5V over about an eighth of a millisecond and slowly recovers due to the feedback-based control over a period of about 4.5 milliseconds to about the target voltage level of just below 22.0V. It will be appreciated that the overshoot in output voltage level is significantly mitigated by the configuration of DC-DC converter 100, as compared with the configuration of DC-DC converter 10.

It will be appreciated that, while the methods and systems described herein have been employed in DC-DC converter applications, alternatives are possible. For example, the methods and systems described herein may be employed in other types of digitally-controlled DC-DC converters, and may be employed in other types of power conditioners used for conditioning power received from power supplies such as batteries for provision to a load.

In some embodiments, a method is provided for regulating a power conditioner output voltage level. The method includes monitoring a first voltage level of a first supply source and a second voltage level of a second supply source. The method also includes, while the power conditioner is being supplied by the first supply source, controlling a duty-cycle of an output switch of the power conditioner with feedback-based control signals generated based on errors between a target voltage level and samples of the output voltage level obtained at an output voltage sampling frequency. The method also includes, responsive to receiving a change signal indicating a change from the power conditioner being supplied by the first supply source to the power conditioner being supplied by the second supply source, controlling, for a period corresponding to the output voltage sampling frequency, the duty-cycle of the output switch with an estimated control signal, the estimated control signal generated by multiplying a previously generated feedback-based control signal by a ratio of the first voltage level to the second voltage level. The method also includes, while the power conditioner is being supplied by the second supply source, controlling the duty-cycle of the output switch using the feedback-based control signals.

In some embodiments, the method includes controlling the duty-cycle of the output switch using the feedback-based control signals includes generating the feedback-based control signals as a sum of: a previous feedback-based control signal; and a weighted combination of: a present error calculated as a difference between a present sample of the output voltage level and the target voltage level; and a previous error calculated as a difference between a previous sample of the output voltage level and the target voltage level. In some embodiments, the method includes, responsive to the change signal, setting stored values of the present error and the previous error to zero. In some embodiments, the output switch includes a MOSFET associated with an output terminal of the power conditioner. In some embodiments, controlling the duty-cycle of the output switch using the feedback-based control signals includes: obtaining current signals indicative of electrical current through an inductor of the power conditioner; providing the feedback-based control signals and the current signals as inputs to a comparator; and driving a gate of the output switch based on an output of the comparator. In some embodiments, driving the gate of the output switch based on the output of the comparator includes: providing the output of the comparator to an input of a driver; and driving the gate of the output switch with an output of the driver. In some embodiments, the method includes periodically calculating an estimated value of the estimated control signal and storing the estimated value; and responsive to the change signal: retrieving the estimated value of the estimated control signal; and generating the estimated control signal based on the estimated value. In some embodiments, the method includes, responsive to the change signal, calculating an estimated value of the estimated control signal; and generating the estimated control signal based on the estimated value. In some embodiments, the period corresponding to the output voltage sampling frequency is a single sampling period. In some embodiments, the monitoring of the first voltage level of the first supply source and the second voltage level of the second supply source includes: sampling the first voltage level and the second voltage level at the output voltage sampling frequency.

In some embodiments, a power conditioner output voltage level regulating system is provided. The system includes a processor and a memory including instructions that, when executed by the processor, cause the processor to monitor a first voltage level of a first supply source and a second voltage level of a second supply source. The instructions also cause the processor to, while the power conditioner is being supplied by the first supply source, control a duty-cycle of an output switch of the power conditioner with feedback-based control signals generated based on errors between a target voltage level and samples of the output voltage level obtained at an output voltage sampling frequency. The instructions also cause the processor to, responsive to receiving a change signal indicating a change from the power conditioner being supplied by the first supply source to the power conditioner being supplied by the second supply source, control, for a period corresponding to the output voltage sampling frequency, the duty-cycle of the output switch with an estimated control signal, the estimated control signal generated by multiplying a previously generated feedback-based control signal by a ratio of the first voltage level to the second voltage level. The instructions also cause the processor to, after the period, while the power conditioner is being supplied by the second supply source, control the duty-cycle of the output switch using the feedback-based control signals.

In some embodiments, the instructions that, when executed by the processor, cause the processor to control the duty-cycle of the output switch with the feedback-based control signals include instructions that, when executed by the processor, cause the processor to: generate the feedback-based control signals as a sum of: a previous feedback-based control signal; and a weighted combination of: a present error calculated as a difference between a present sample of the output voltage level and the target voltage level; and a previous error calculated as a difference between a previous sample of the output voltage level and the target voltage level. In some embodiments, the memory includes instructions that, when executed by the processor: responsive to the change signal, set stored values of the present error and the previous error to zero. In some embodiments, the output switch includes a MOSFET associated with an output terminal of the power conditioner. In some embodiments, the instructions that control the duty-cycle of the output switch using the feedback-based control signals include instructions that, when executed by the processor, cause the processor to: obtain current signals indicative of electrical current through an inductor of the power conditioner; provide the feedback-based control signals and the current signals as inputs to a comparator; and drive a gate of the output switch based on an output of the comparator. In some embodiments, the instructions that drive the gate of the output switch based on the output of the comparator include instructions that, when executed by the processor, cause the processor to: provide the output of the comparator to an input of a driver; and drive the gate of the output switch with an output of the driver. In some embodiments, the memory includes instructions that, when executed by the processor, cause the processor to: periodically calculate an estimated value of the estimated control signal and store the estimated value; and responsive to the change signal: retrieve the estimated value of the estimated control signal; and generate the estimated control signal based on the estimated value. In some embodiments, the memory includes instructions that, when executed by the processor, cause the processor to: responsive to the change signal, calculate an estimated value of the estimated control signal; and generate the estimated control signal based on the estimated value. In some embodiments, the period corresponding to the output voltage sampling frequency is a single sampling period. In some embodiments, the instructions that, when executed by the processor, cause the process to monitor the first voltage level of the first supply source and the second voltage level of the second supply source include instructions that, when executed by the processor, cause the processor to: sample the first voltage level and the second voltage level at the output voltage sampling frequency.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that includes instructions that, when executed by a processor, cause the processor to implement a feature of the module.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for regulating a power conditioner output voltage level, the method comprising:
    monitoring a first voltage level of a first supply source and a second voltage level of a second supply source;
    while the power conditioner is being supplied by the first supply source, controlling a duty-cycle of an output switch of the power conditioner with feedback-based control signals generated based on errors between a target voltage level and samples of the output voltage level obtained at an output voltage sampling frequency;
    responsive to receiving a change signal indicating a change from the power conditioner being supplied by the first supply source to the power conditioner being supplied by the second supply source, controlling, for a period corresponding to the output voltage sampling frequency, the duty-cycle of the output switch with an estimated control signal, the estimated control signal generated by multiplying a previously generated feedback-based control signal by a ratio of the first voltage level to the second voltage level; and
    while the power conditioner is being supplied by the second supply source, controlling the duty-cycle of the output switch using the feedback-based control signals.

2. The method of claim 1, wherein controlling the duty-cycle of the output switch using the feedback-based control signals comprises:
    generating the feedback-based control signals as a sum of:
        a previous feedback-based control signal; and
        a weighted combination of:
            a present error calculated as a difference between a present sample of the output voltage level and the target voltage level; and
            a previous error calculated as a difference between a previous sample of the output voltage level and the target voltage level.

3. The method of claim 2, further comprising:
    responsive to the change signal, setting stored values of the present error and the previous error to zero.

4. The method of claim 1, wherein the output switch includes a MOSFET associated with an output terminal of the power conditioner.

5. The method of claim 4, wherein the controlling the duty-cycle of the output switch using the feedback-based control signals includes:
    obtaining current signals indicative of electrical current through an inductor of the power conditioner;
    providing the feedback-based control signals and the current signals as inputs to a comparator; and
    driving a gate of the output switch based on an output of the comparator.

6. The method of claim 5, wherein driving the gate of the output switch based on the output of the comparator includes:
    providing the output of the comparator to an input of a driver; and
    driving the gate of the output switch with an output of the driver.

7. The method of claim 1, including:
    periodically calculating an estimated value of the estimated control signal and storing the estimated value; and
    responsive to the change signal:
        retrieving the estimated value of the estimated control signal; and
        generating the estimated control signal based on the estimated value.

8. The method of claim 1, including:
    responsive to the change signal, calculating an estimated value of the estimated control signal; and
    generating the estimated control signal based on the estimated value.

9. The method of claim 8, wherein the period corresponding to the output voltage sampling frequency is a single sampling period.

10. The method of claim 1, wherein the monitoring of the first voltage level of the first supply source and the second voltage level of the second supply source includes:
    sampling the first voltage level and the second voltage level at the output voltage sampling frequency.

11. A power conditioner output voltage level regulating system, comprising:
    a processor; and
    a memory including instructions that, when executed by the processor, cause the processor to:
    monitor a first voltage level of a first supply source and a second voltage level of a second supply source;
    while the power conditioner is being supplied by the first supply source, control a duty-cycle of an output switch of the power conditioner with feedback-based control signals generated based on errors between a target voltage level and samples of the output voltage level obtained at an output voltage sampling frequency;
    responsive to receiving a change signal indicating a change from the power conditioner being supplied by the first supply source to the power conditioner being supplied by the second supply source, control, for a period corresponding to the output voltage sampling frequency, the duty-cycle of the output switch with an estimated control signal, the estimated control signal generated by multiplying a previously generated feedback-based control signal by a ratio of the first voltage level to the second voltage level; and after the period, while the power conditioner is being supplied by the second supply source, control the duty-cycle of the output switch using the feedback-based control signals.

12. The system of claim 11, wherein the instructions that, when executed by the processor, cause the processor to control the duty-cycle of the output switch with the feedback-based control signals include instructions that, when executed by the processor, cause the processor to:
generate the feedback-based control signals as a sum of:
a previous feedback-based control signal; and
a weighted combination of:
a present error calculated as a difference between a present sample of the output voltage level and the target voltage level; and
a previous error calculated as a difference between a previous sample of the output voltage level and the target voltage level.

13. The system of claim 12, the memory including instructions that, when executed by the processor:
responsive to the change signal, set stored values of the present error and the previous error to zero.

14. The system of claim 12, wherein the output switch includes a MOSFET associated with an output terminal of the power conditioner.

15. The system of claim 14, wherein the instructions that control the duty-cycle of the output switch using the feedback-based control signals include instructions that, when executed by the processor, cause the processor to:
obtain current signals indicative of electrical current through an inductor of the power conditioner;
provide the feedback-based control signals and the current signals as inputs to a comparator; and
drive a gate of the output switch based on an output of the comparator.

16. The system of claim 15, wherein the instructions that drive the gate of the output switch based on the output of the comparator include instructions that, when executed by the processor, cause the processor to:
provide the output of the comparator to an input of a driver; and
drive the gate of the output switch with an output of the driver.

17. The system of claim 11, the memory including instructions that, when executed by the processor, cause the processor to:
periodically calculate an estimated value of the estimated control signal and store the estimated value; and
responsive to the change signal:
retrieve the estimated value of the estimated control signal; and
generate the estimated control signal based on the estimated value.

18. The system of claim 11, the memory including instructions that, when executed by the processor, cause the processor to:
responsive to the change signal, calculate an estimated value of the estimated control signal; and
generate the estimated control signal based on the estimated value.

19. The system of claim 18, wherein the period corresponding to the output voltage sampling frequency is a single sampling period.

20. The system of claim 11, wherein the instructions that, when executed by the processor, cause the processor to monitor the first voltage level of the first supply source and the second voltage level of the second supply source include instructions that, when executed by the processor, cause the processor to:
sample the first voltage level and the second voltage level at the output voltage sampling frequency.

* * * * *